UNITED STATES PATENT OFFICE.

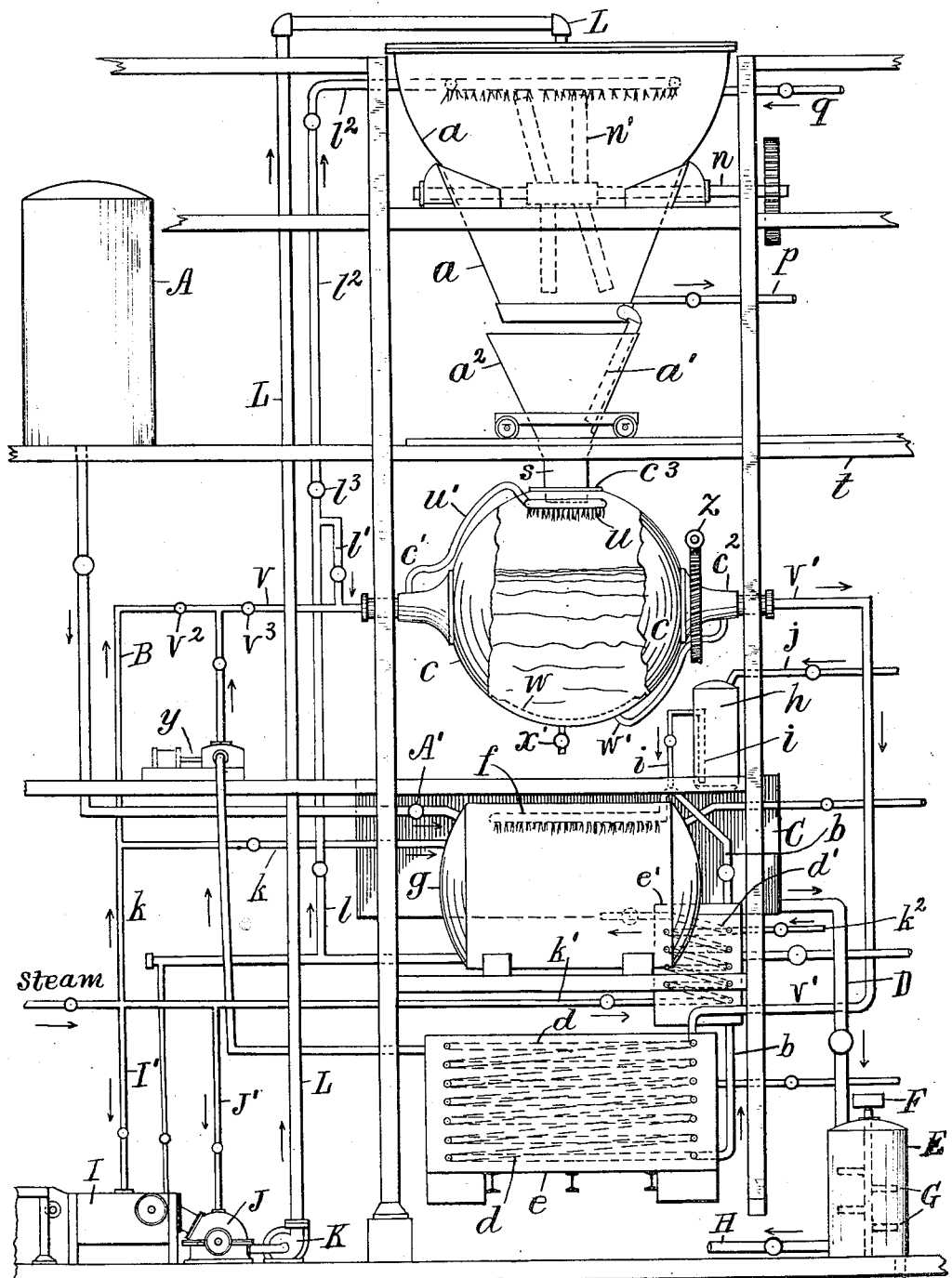

MICHAEL R. KENNEDY, OF DANSVILLE, NEW YORK, ASSIGNOR TO THE NATIONAL STRAW PULP COMPANY, OF NEW YORK, N. Y., A CORPORATION OF SOUTH DAKOTA.

EXTRACTING FIBERS FROM VEGETABLE TISSUES.

951,317.            Specification of Letters Patent.      Patented Mar. 8, 1910.

Application filed January 28, 1907, Serial No. 354,397. Renewed January 21, 1910. Serial No. 539,313.

*To all whom it may concern:*

Be it known that I, MICHAEL R. KENNEDY, a citizen of the United States, of Dansville, county of Livingston, and State of New York, have invented certain new and useful Improvements in Extracting Fibers from Vegetable Tissues, fully described and represented in the following specification and the accompanying drawings, forming a part of the same.

The object of this invention is to reduce the cost and improve the efficiency of processes in which straw and analogous substances are treated with chemical liquors in a divided process for the extraction of the fiber.

In the present invention, a digester is employed for a preliminary treatment of the material at a temperature below the boiling point, and a cooker arranged below the digester is employed for the final treatment of the material under steam pressure at a high temperature, it being found that the silica and other impurities can be separated from the fiber more advantageously, in respect to the quality of the fiber, by first treating the material at a low temperature with the spent liquor derived from the final treatment, and that such a preliminary treatment of the material at a low temperature will actually separate elements from the fiber more effectively than it is possible to accomplish later by a stronger liquor at a higher temperature and pressure.

The process will be understood from the following description, with reference to the annexed drawing, which is of a diagrammatic character and has the various pipe-valves represented by circles.

In the drawing, $a$ designates a digester for a preliminary treatment of the material; $a^2$ a funnel for transferring the material when partially treated to a digester, termed herein the "cooker" $c$, for final treatment.

$d$ designates a coil for the circulation of the spent liquor through a cooling-tank $e$, and $b$ a pipe conveying the liquor to a storage tank $g$.

$h$ designates a lime-water tank having a pipe $i$ for discharging the lime-water into the pipe $b$ close to the tank $g$.

$j$ designates a pipe by which steam or hot air can be introduced into the tank $h$ for driving the lime-water forcibly into the pipe $b$, where it is mingled with the spent liquor flowing into the tank $g$. The pipe $b$ has a perforated extension $f$ within the tank $g$ for spraying the mixture of liquor and lime-water into said tank, which produces an immediate reaction and separates a part of the soda from the silica and thus revivifies the liquor by rendering such soda active. The silica has a greater affinity for the lime than for the soda, and this operates to form a silicate of lime which sets some of the soda free; but any well known reagent may be used which would produce the desired reaction, as I make no claim to its use herein.

When the revivified liquor in the tank $g$ is required for use in the digester $a$ or cooker $c$, steam is supplied to the tank $g$ by a pipe $k$, and the liquor is forced from the same into either of the said vessels by the steam pressure. The pipe $l$ which leads from the bottom of the tank $g$ has a branch $l'$ to supply the cooker $c$, and a branch $l^2$ extended into the digester $a$ for spraying the liquor upon the contents. The digester $a$ may be heated, but no steam pressure is used in the preliminary treatment and the temperature is thus below the boiling point and therefore very much lower than in the cooker $c$, where a high temperature is intentionally produced by a steam pressure between 50 and 100 pounds per square inch.

The digester $a$ is shown with a stirring-shaft $n$ having paddles $n'$ to stir the straw, which operates not only to mingle the liquor with it, but to disintegrate the particles by attrition with one another and with the sides of the digester. Such mechanical agitation brings the revivified liquor into intimate contact with all parts of the straw, and operates slowly and gradually to remove a portion of the foreign elements. When such treatment with the revivified liquor is completed, the liquor is drawn off by a pipe $p$, and water is supplied through a pipe $q$, and the stirring with the paddles renewed to diffuse the water thoroughly throughout the straw. The washing water is then withdrawn through the pipe $p$, and the door $a'$ of the digester is opened into the funnel $a^2$. A vertically movable tube $s$ is shown fitted through the floor $t$ into the manhole of the cooker to discharge the partially treated straw into the same, from the funnel. The tube is lifted when the cooker is rotated.

The cooker is shown with an annular spray-pipe $u$ within the manhole, connected by pipe $u'$ with a pipe $v$ extended from one of the trunnions $c'$ of the cooker. A pipe $v'$ is extended from the other trunnion $c^2$ to discharge the spent liquor to the cooling coil $d$, from which the liquor is delivered to the tank $g$ by the pipes $b$ and $f$. A strainer $w$ is shown in the bottom of the cooker, and pipe $w'$ connects the space below the strainer with the pipe $v'$ upon the trunnion $c^2$. A discharge cock $x'$ discharges from the space below the strainer, for use in emergencies.

The water used for cooling the coil $d$ in the tank $e$ becomes heated, and is used for washing the charge in the cooker at the close of the final treatment, the hot water being drawn from the tank by a pump $y$ and discharged into the cooker when required through the pipe $v$. A cock $v^3$ is shown in the pipe $v$ to be closed when the liquor is supplied through the branch-pipe $l'$.

When the charge of material is received in the cooker, the manhole $c^3$ would be closed and the cooker rotated by suitable gearing represented by the worm and worm-wheel $z$. The tank $g$ having been emptied of the revivified liquor at this stage of the operation, would be supplied with fresh liquor from a supply-tank A; and a cock A' in such pipe being closed, steam or hot air is introduced by the pipe $k$, and the liquor forced through the pipes $l$ and $l'$ into the spray-pipe $u$, which diffuses it upon the material while in motion, a cock $l^3$ above the pipe $l'$ being closed.

In the cooker, steam of high pressure, as 150 pounds, is used to develop a high temperature, and accelerate the action of the chemicals. When the material has received its final treatment with the strong liquor for a sufficient length of time, the motion of the cooker is stopped with the strainer $w$ at the bottom, and steam is introduced to the pipe $u$ from a pipe B, thus pressing upon the material in the cooker and forcing the liquid out of the same through the pipe $w'$ to the pipe $v'$, and such liquor, being spent liquor, is discharged through the coil $d$ to the tank $g$. Washing water is then introduced by means of the pump $y$ through the pipe $u'$ and the cooker rotated to diffuse the same through the material, the washing water being drawn off when completed, as just described for the liquor; all foreign substances being removed with such water, leaving the fiber of the straw completely extracted and ready for use, except in cases where it requires bleaching.

The mechanical agitation of the material in the preliminary treatment at low temperature is very desirable, as it assists in separating the foreign substances from the fiber by a partial disintegration of the tissues, and I have therefore claimed the disintegration by such mechanical means.

In operating the process practically, it is found desirable to adjust the strength of the revivified liquor which is used in the preliminary treatment of the material, and the strength of the fresh chemicals which are used in the final treatment of the material, so that the two treatments may occupy the same amount of time, which thus permits the first and second treatment of two batches of material to proceed simultaneously and to be completed at the same time, so that the pulp or fiber extracted in the cooker may be discharged and the material in the disintegrator be ready at such time for discharge into the emptied cooker. To operate in this manner, the revivified liquor to be used in the preliminary treatment is, by mixture with water, or otherwise, made of such a strength as to produce the desired preliminary effects upon the straw in the disintegrator, during the same length of time as is required for the fresh chemicals to complete the treatment of a batch in the cooker. In preparing the liquor for use in the digester $a$, it is desirable to deliver the liquor at a certain temperature, and a temperature regulator is shown in a closed vessel $e'$ through which the liquor is conducted from the pipe $b$ on its way to the tank $g$. To regulate the temperature of the vessel $e'$, a coil $d'$ is extended through the same, and has a steam connection $k'$ for heating it when desired, and a pipe with a water connection $k^2$ for cooling it when necessary.

A receiving tank C is shown behind the tank $g$, arranged below the cooker $c$ to receive the fiber therefrom when fully treated, the manhole $c^3$ being turned downward when necessary to discharge the pulp or fiber into the receiving tank. To thoroughly mix all the particles of pulp for using it in the manufacture of paper or pasteboard, it is drawn from the receiving tank in separate charges into a mixer E, having a stirring shaft rotated by a pulley F and provided with paddles G to thoroughly agitate the pulp to make it of uniform grade throughout. A pipe H serves to empty the mixer E when its charge is required for use.

In the drawing, a straw-cutter I, straw-shredder J and straw pumping device K are shown, the two former being supplied with steam pipes I' and J', and the outlet of the straw pump K being connected by pipe L with the top of the digester $a$. The straw is reduced to such a fineness, and mixed with water sufficiently, when it leaves the straw pump K, that it may be forced by this device through the pipe L into the digester; but the divided treatment with the liquor can be practiced as described, with dry straw that is merely chopped for insertion in the digester $a$.

The pipe $w$ is shown extended from the tank *g* to the top of the straw-cutter I, which in my invention is made with a tight casing, and a portion of the liquor injected in the casing to moisten the straw during the cutting operation, which mingles the liquor most intimately with every part of the straw, and thus prepares the straw for further treatment in the straw-shredder, in which the liquor is mixed more intimately with the straw, and the latter thus adapted for a rapid action of the chemicals applied to it in the digester.

The straw-cutter and the other attachments for treating the straw before feeding it to the digester may be placed above the level of the digester, and the material discharged into the same by gravity.

This invention secures not only an economy in the chemicals employed, but a very material saving in the time required for the treatment with the new chemicals, as the preliminary treatment with the spent liquor, separates some of the elements to better advantage than they can be separated by strong chemicals at high temperature. A further saving in time may be effected by using the spray-pipe *u* to spray either the spent liquor or fresh chemicals upon the material when it is discharged from the digester into the cooker after the preliminary treatment and the washing of the preliminary chemicals therefrom. The spraying of the material upon its passage into the cooker serves to bring the chemicals into most intimate contact with the material, mixing it all through the same, and preparing it in the most effective manner for the subsequent treatment in the cooker. Such mixing of the chemicals and material could not be effected by merely supplying the chemical in a body to a mass of material already in the cooker, as much time would be required to mix the chemical and the material thoroughly together by the mere rotation of the cooker.

Having thus set forth the nature of the invention what is claimed herein is:

1. The improvement in the process of extracting fiber from straw, which consists in applying the greater part of the spent liquor from a high temperature treatment of one charge to the preparatory or partial treatment of a succeeding charge at a less than boiling temperature, then washing the liquor from such partially treated charge, spraying the charge with the remainder of the spent liquor, and finally, subjecting the partially treated charge to the action of fresh chemicals at a much more than boiling temperature.

2. The improvement in the process of extracting fiber from straw in a digester and cooker arranged one above the other for preparatory and final treatments, which consists in applying a portion of the spent liquor, drawn from a high temperature treatment of one charge in the lower or final cooker, to the preparatory treatment of a succeeding charge in the upper or preparatory digester, then washing the liquor from such partially treated charge with hot water in the preparatory digester, mingling fresh chemicals with the charge in such preparatory digester and discharging such charge into the final cooker, and treating the same at higher temperature, whereby the charge is condensed, thoroughly moistened, and heated before its treatment at high temperature.

3. The improvement in the process of extracting fiber from finely cut straw, which consists in applying a portion of the spent liquor from a high temperature treatment of one charge, to the straw, during the cutting of the straw in preparing it for the high temperature treatment, whereby the liquor is intimately mixed with the straw before the latter is subjected to any other chemical or mechanical treatment.

4. The improvement in the process of extracting fiber from straw, which consists in applying a part of the spent liquor from a treatment of one charge at a temperature much above boiling, to the preparatory treatment of a succeeding charge at a temperature below boiling, then washing the liquor from such partially treated charge, charging the material at the close of the preparatory treatment slowly into a cooker for final treatment and spraying the material with the liquor from such high temperature treatment while it is entering the cooker, whereby the liquor is thoroughly mixed with the material before it is agitated in the cooker.

5. The improvement in the process of extracting fiber from straw in a divided treatment, which consists in first subjecting the material in a digester to a preparatory treatment at a temperature less than boiling, and then to a treatment in a tightly closed cooker under steam pressure at a temperature higher than boiling.

In testimony whereof I have hereunto set my hand in the presence of two subscribing witnesses.

MICHAEL R. KENNEDY.

Witnesses:
PARLEY M. HAMMOND,
CHAS. H. UNVERZAGT.